United States Patent [19]
DiMaggio

[11] Patent Number: 5,016,144
[45] Date of Patent: May 14, 1991

[54] ILLUMINATING WHEEL COVERS

[76] Inventor: Darryl DiMaggio, 10904 Scarsdale Blvd., Suite 140, Houston, Tex. 77089

[21] Appl. No.: 500,727

[22] Filed: Mar. 28, 1990

[51] Int. Cl.$^5$ .............................................. B60Q 1/00
[52] U.S. Cl. ........................................ 362/35; 362/78
[58] Field of Search ..................... 362/35, 78, 800

[56] References Cited

U.S. PATENT DOCUMENTS

| | | | |
|---|---|---|---|
| 3,789,208 | 1/1974 | Lewis | 362/35 |
| 4,367,515 | 1/1983 | Beard | 362/800 |
| 4,381,537 | 4/1983 | Hinrichs | 362/78 |
| 4,383,244 | 5/1983 | Kaauff | 340/321 |
| 4,775,919 | 10/1988 | Pearsall | 362/78 |

Primary Examiner—Carroll B. Dority

[57] ABSTRACT

A unique and improved illuminating vehicle wheel cover using advanced electronics to illuminate light emitting diodes, aesthetically arranged, to create an illusionary effect. The present invention includes a unique momentary rotating mercury switch which gathers mercury during rotation and causes a momentary electrical connection.

6 Claims, 5 Drawing Sheets

ILLUMINATING WHEEL COVERS

FIELD OF THE INVENTION

The field of the present invention is illumination. Specifically, the present invention is directed to a unique and improved illumination of wheel covers (particularly for but not limited to automobiles) with the use of light emitting diodes (LED's). Means of activating the illuminating wheel covers for slow to moderate starts may be a momentary rotating mercury switch and a centrifugal force activated switch or faster starts.

BACKGROUND OF THE INVENTION

There are always new uses being found or desired for electronic components. The present invention has combined state of the art electronics with the current trend of modified and customized vehicles. This combination lends itself to an interesting means of self-expression. The present invention may also be expanded to bicycles or the like. Attempts to illuminate wheels have been tried in the past but has proven to be expensive and difficult to operate.

U.S. Pat. No. 4,775,919, Pearsall, et al., teaches a lighted wheel cover with a self-contained generator which includes inner and outer housing that use magnetic field to induce current flow.

U.S. Pat. No. 4,383,244, Knauff teaches a multi-light display device and generator which accomplishes a "strobe" effect by use of LED's.

None of the prior art references found provide for rotational detection or directional detection. They also do not include momentary on type switches, nor do they provide for an off condition regardless of position at rest; as does the present invention.

SUMMARY OF THE PRESENT INVENTION

The present invention takes a novel approach to the illumination of wheel covers. Light emitting diodes (LED's) are arranged in an aesthetically pleasing manner and activated by a momentary rotating mercury switch which is used to detect rotation at very slow to moderate speeds. When an appropriate speed is reached, a centrifugal force activated switch takes over to operate the LED's. The effect achieved by the illuminating wheel cover of the present invention, as engaged, is LED's pulsating at approximately 40 Hz to 60 Hz. The lines of LED's create an illusionary effect and appear to increase in number, rotate, reverse direction, decrease in number and change speed as the vehicle accelerates and decelerates. Pulse duration and time between pulses determines the most aesthetic effect.

LED's are manufactured with a 16 degree beamwidth which is unsuitable for the present invention. The LED's are modified by using a multifaceted bead type lens to essentially widen the beamwidth to approximately 180 degrees. This modification allows the light emitted by the LED's to be seen at all possible angles alongside the vehicle.

Source of power is preferably a 9-volt battery because it is a standard size power source for this type of device and batteries are the most efficient and practical portable source of power since they are self-contained.

A momentary rotating mercury switch may be used to complete the electrical connection as a vehicle begins movement very slowly or moderately. The momentary rotating mercury switch (hereinafter referred to as the mercury switch) is preferably a hollow, pillbox shaped cylinder comprising a baffle which extends the entire length of the cylinder's radius, metal contacts and a suitable amount of mercury as well as a center rod contact. The mercury switch is mounted in the center of the present invention so as to most efficiently detect rotation. As the vehicle begins to move, the mercury, due to gravity, is gathered at the lowest point and either makes no contact or contact with only one side of the switch. Depending on the rotation position, the mercury pours down from the baffle, over the center rod contact and makes a momentary electrical connection. This process is done within the first revolution. As the vehicle increases speed, the electrical current is transferred to the centrifugal force activated switch which supplies current to a series of electronic circuits; hence illuminating the lED's which have been arranged in a preferred manner on a standard vehicle wheel cover. After the vehicle ceases movement for a particular time, the system deactivates.

Means of attaching the illuminating wheel covers to an existing wheel may be magnets, conventional means or the like. A locking means may be added to prevent possible theft of the wheel cover.

An object of the present invention is to provide a unique and aesthetically pleasing display of light emitting diodes.

Another object of the present invention is to provide an arrangement of electronic circuitry for activating the light emitting diodes.

Another object of the present invention is to provide a source of power for the light emitting diodes.

Another object of the present invention is to provide a unique momentary rotating mercury switch which uses gathered mercury to complete an electrical connection for the purpose of activating the current supplied to the light emitting diodes.

Still another object of the present invention is to provide a means of transferring the activated current to a centrifugal force activated switch so as to continue supplying the light emitting diodes.

Yet another object of the present invention is to provide a means of deactivating the power to the activated light emitting diodes automatically after the vehicle remains stationary for a particular amount of time.

DESCRIPTION OF THE PREFERRED EMBODIMENT

Figure 1:
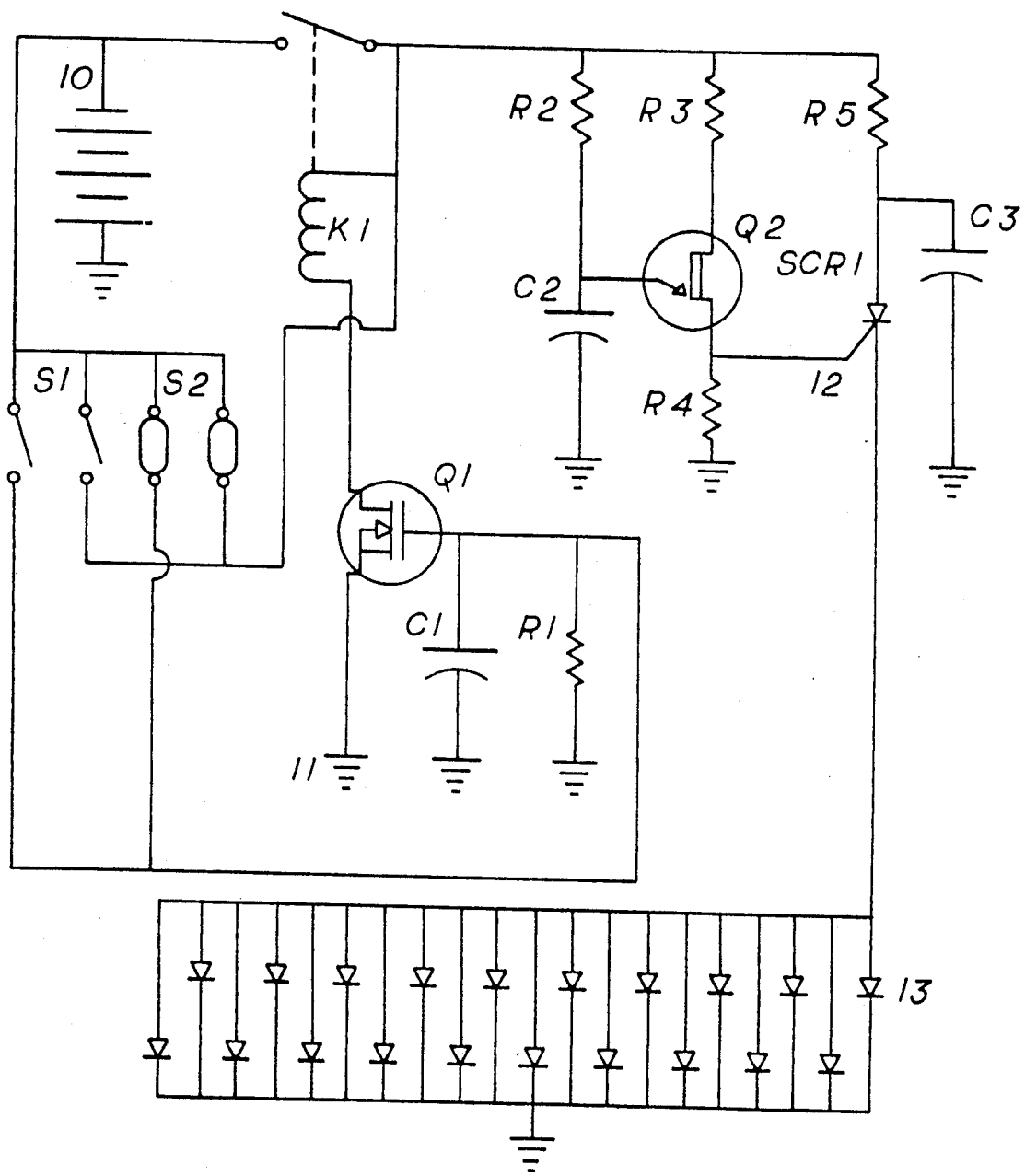
FIG. 1 is a schematic illustration of the circuitry of the present invention.
Figure 2:
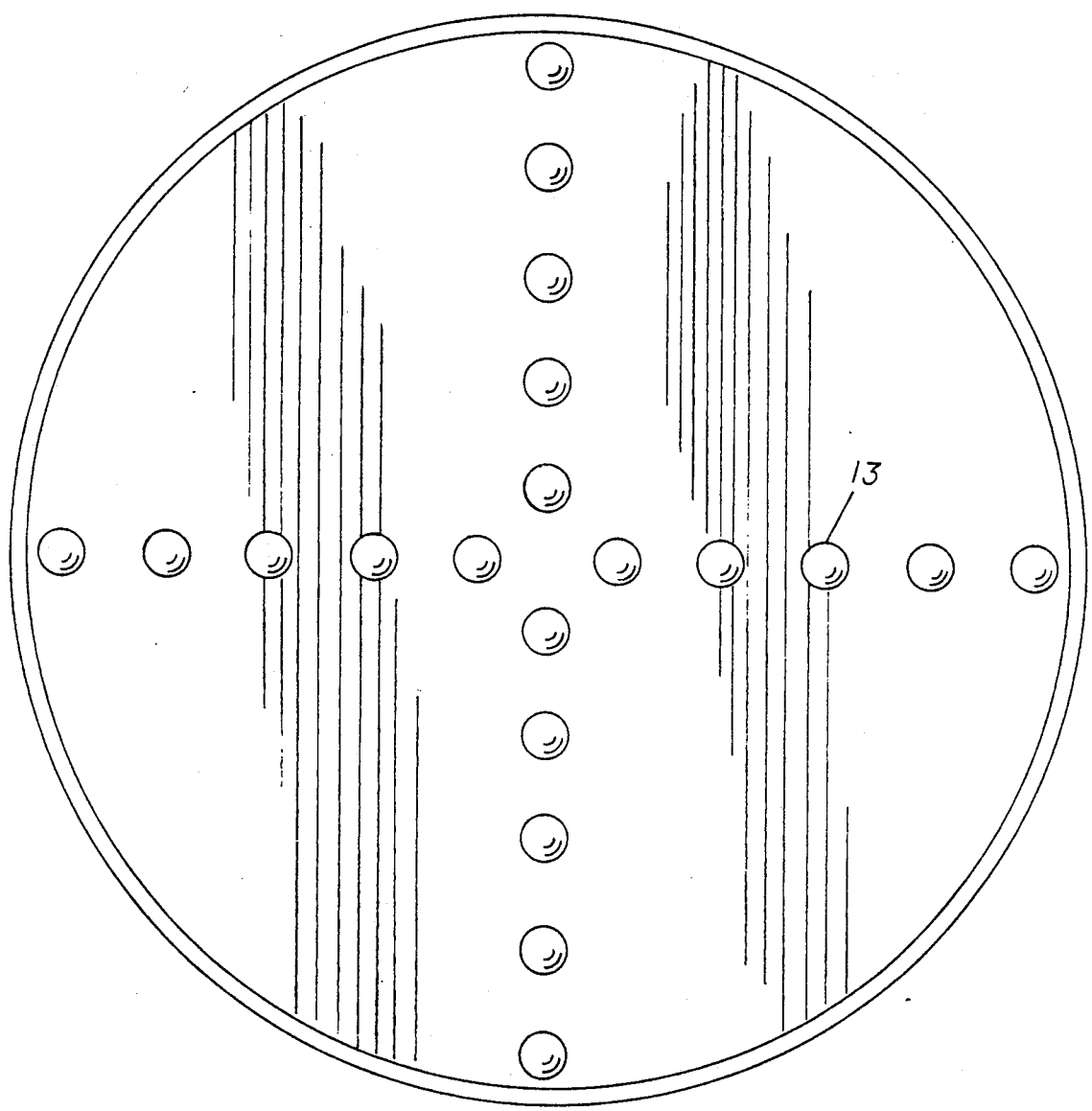
FIG. 2 is one arrangement of light emitting diodes of the present invention.
Figure 3:
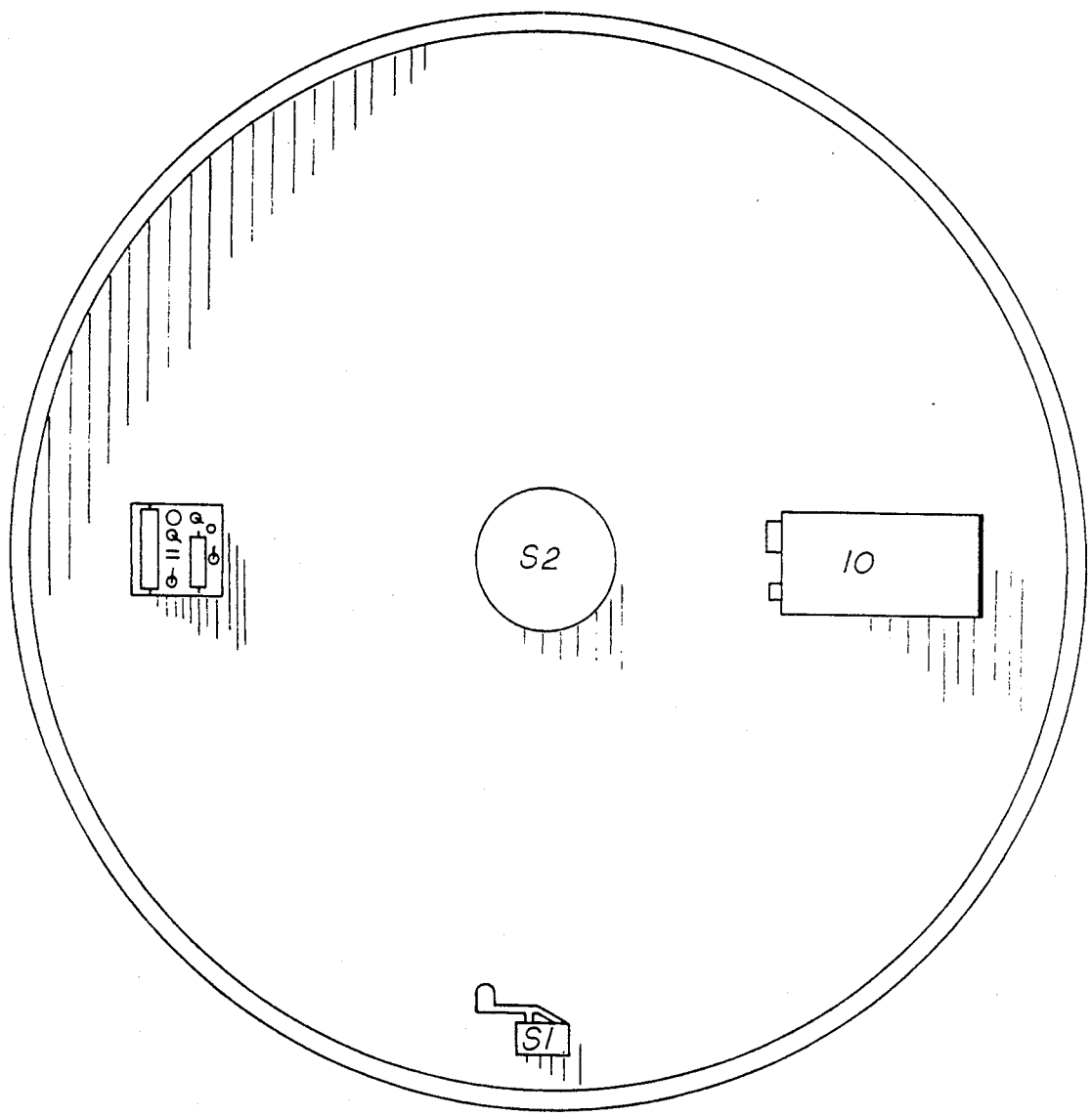
FIG. 3 is a rear view of the present invention illustrating the electronic printed circuit board, momentary rotating mercury switch, centrifugal switch and power source.

Referring now to the drawings in detail, FIG. 1 is a schematic illustration of the circuitry of the present invention.

The power source 10 supplies voltage to centrifugal switch S1 and momentary rotating mercury switch S2. As a vehicle, equipped with the present invention, begins movement, S2 operates to engage N channel MOSFET Q1, by charging capacitor C1 in combination with resistor R1 or the like; thus closing relay coil K1 which is essentially at ground 11. Once K1 is activated, it remains activated as long as Q1 is operative.

K1 contacts also supply voltage to remaining circuitry. An oscillator Q2 along with capacitor C2, in combination with resistors R2, R3, R4, turn current on and off at precise times; creating pulses. The current increases instantly from zero to maximum value, stays at this maximum value for a period of time and then instantly decreases to zero, making square wave pulses to the gate 12 of the silicon controlled rectifier SCR1. The SCR1 is a high current device used as a buffer to isolate Q2 and LED's 13. Q2 alone does not produce enough current to illuminate the LED's 13; thus the necessity of the SCR1. SCR1 in conjunction with capacitor C3 provides square pulses of 40 Hz to 60 Hz to the LED's 13 causing them to glow.

Timer circuitry Q1, capacitor C1 and resistor R1 are designed to keep the circuitry activated for a particular time after all movement has ceased; therefore, the LED's 13 continue to glow when the vehicle is momentarily stopped at a signal light or in traffic or the like. When all motion ceases, centrifugal switch S1 and momentary rotating mercury switch 20 open. The only force holding Q1 in activation is the charge on capacitor C1. As the charge on capacitor C1 slowly drains off, through resistor R1, it begins to deactivate Q1. When the resistance of Q1 becomes high enough, K1 can no longer remain activated and drops out, shutting down all circuitry. There is no power source 10 drain in this off condition.

Figure 4:
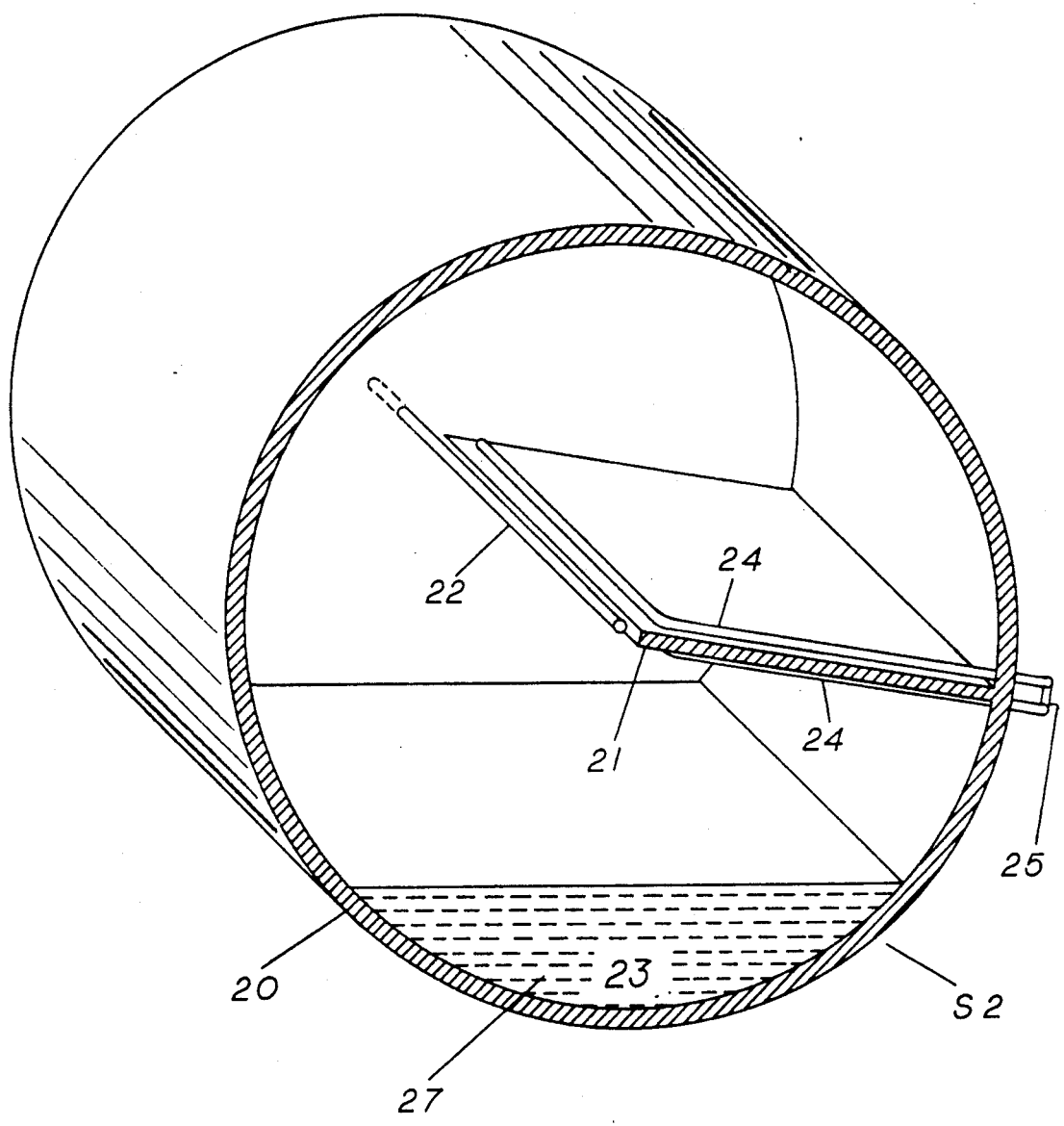
FIG. 4 is an exploded top view of the momentary rotating mercury switch in stationary position without contact being made.
Figure 5:
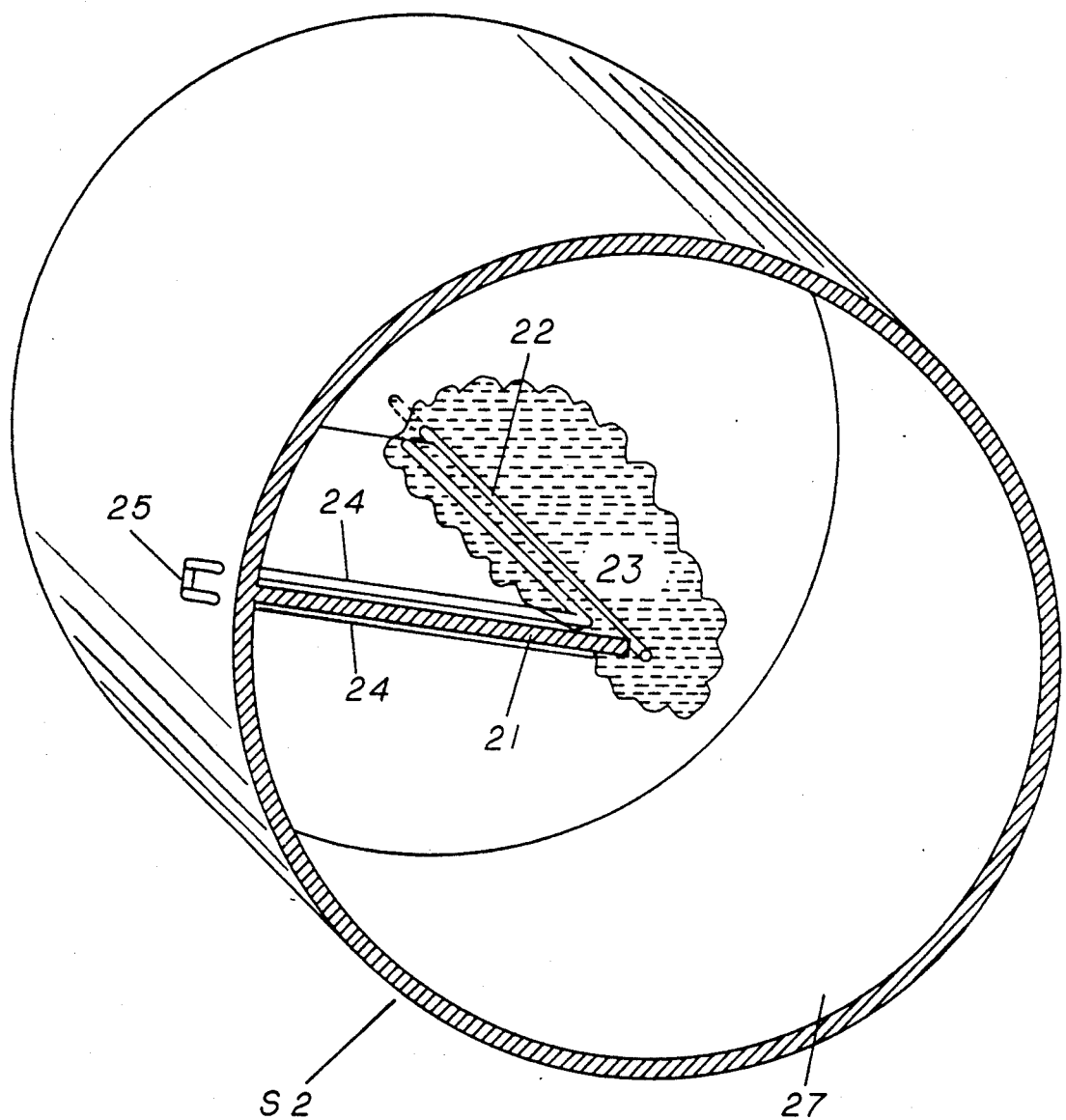
FIG. 5 is an exploded top view of the momentary rotating mercury switch illustrating rotation and mercury pouring down from the baffle to make an electrical connection.

Now referring in detail to FIGS. 4–6 which illustrate the momentary rotating mercury switch 20 mounted within a conventional wheel cover. The wheel cover can be mounted in a standard fashion to the wheel of a vehicle. Wheel covers are well known in the prior art, as are the standard methods of attachment. The mercury switch 20 is preferably a hollow, pillbox shaped cylinder comprising a solid baffle 21 which covers the length of the cylinder's radius. Also comprising a center rod contact 22 which may be made of a suitable metal or alloy so as not to react negatively to mercury 23. The center rod contact 22 may be positioned through the axis or center of rotation and parallel with the axis; making up one side of a single pole, single throw switch.

Two metal contacts 24 are positioned directly along each side of the baffle 21, but cease just short of the center point of the radius. These two metal contacts 24 are electronically joined together through the outside wall of the cylinder by a connection 25 to make up one side of the mercury switch 20. In this configuration, single pole, single throw 26, the mercury switch 20 will detect motion in either direction of rotation. In the initial operation, the mercury 23, due to gravity, is gathered at the lowest point 27; making contact with only one side of the metal contacts 24, regardless of rotation position. As rotation occurs, the baffle 21 gathers mercury 23 from the lowest point 27 and lifts it. As rotation continues, see FIG. 5, the mercury 23 pours down from the baffle 21, over center rod contact 22, making momentary electrical connection between center rod contact 22 and one of the metal contacts 24 which are positioned directly against the baffle 21. The above process should occur within the first revolution regardless of the speed of rotation.

The foregoing description of the invention has been directed to a particular preferred embodiment of the present invention for purposes of explanation and illustration. It will be apparent to those skilled in the art that many modifications and changes in the illuminating wheel covers may be made without departing from the scope and spirit of the invention. It is, therefore, intended that the following claims cover such modifications and changes:

What I claim is:

1. A vehicle wheel cover comprising:
   a plurality of light emitting diodes;
   a power source;
   means for creating an electrical connection between said power source and said light emitting diodes so as to illuminate said light emitting diodes responsive to slow or moderate rotational speeds of said vehicle cover, said means for creating an electrical connection being adapted to transfer and continue current flow from said power source to said light emitting diode as said vehicle cover increases in rotational speeds; and
   operatively connected to said light emitting diodes, said signal means being electronically activated so as to cause said light emitting diodes to pulsate, said signal means being selectively deactivatable.

2. A vehicle wheel cover of claim 1 wherein said power source is a 9-volt battery.

3. A vehicle wheel cover of claim 1 wherein said means of creating an electrical connection for illuminating light emitting diodes at slow to moderate speeds includes a momentary rotating mercury switch.

4. A vehicle wheel cover of claim 1 wherein said means of transferring and continuing current flow after vehicle speed increases includes a centrifugal force activated switch.

5. A vehicle wheel cover of claim 1 wherein said signal means being electronically activated comprises:
   (a) an N channel MOSFET Q1 in combination with a capacitor and resistor or the like;
   (b) relay coil;
   (c) oscillator; and
   (d) silicon controlled rectifier.

6. A vehicle wheel cover of claim 1 wherein said signal means comprises
   (a) timer circuitry including an N channel MOSFET Q1; and,
   (b) a capacitor and resistor designed to keep circuitry activated for only a given amount of time.

* * * * *